United States Patent
Sorensen et al.

(10) Patent No.: US 8,041,590 B2
(45) Date of Patent: Oct. 18, 2011

(54) IN-STORE MEDIA RATING SYSTEM AND METHOD

(75) Inventors: Herb Sorensen, Troutdale, OR (US); David Albers, Gresham, OR (US)

(73) Assignee: Shopper Scientist, LLC, Corbett, OR (US)

( * ) Notice: Subject to any disclaimer, the term of this patent is extended or adjusted under 35 U.S.C. 154(b) by 1156 days.

(21) Appl. No.: 11/820,270

(22) Filed: Jun. 18, 2007

(65) Prior Publication Data

US 2008/0005045 A1    Jan. 3, 2008

Related U.S. Application Data

(60) Provisional application No. 60/815,056, filed on Jun. 19, 2006.

(51) Int. Cl.
*G06F 17/30* (2006.01)
(52) U.S. Cl. .................................. 705/7.11
(58) Field of Classification Search ............... 705/7, 10
See application file for complete search history.

(56) References Cited

U.S. PATENT DOCUMENTS

| | | | |
|---|---|---|---|
| 5,287,266 A | | 2/1994 | Malek et al. |
| 5,406,271 A | * | 4/1995 | Sonnendorfer et al. ..... 340/5.91 |
| 6,101,483 A | * | 8/2000 | Petrovich et al. ............... 705/21 |
| 6,837,436 B2 | * | 1/2005 | Swartz et al. ............ 235/472.02 |
| 7,671,728 B2 | * | 3/2010 | Buehler ........................ 340/506 |
| 2004/0260513 A1 | * | 12/2004 | Fitzpatrick et al. ........... 702/182 |

\* cited by examiner

*Primary Examiner* — Romain Jeanty
(74) *Attorney, Agent, or Firm* — Alleman Hall McCoy Russell & Tuttle LLP

(57) ABSTRACT

In-store media rating systems and methods are provided. A disclosed method includes receiving data from a plurality of individual stores, each having an individual store floor plan including shopper accessible areas and shopper non-accessible areas, and providing a standard floor plan including a plurality of predefined sectors. The method further includes standardizing each respective individual store floor plan to produce a corresponding standardized individual store floor plan based on the standard floor plan, wherein relative location and shopper accessible area of each of the sectors in the each standardized individual store floor plan correspond to the location and shopper accessible area of a corresponding predefined sector of the standard floor plan. The method further includes producing an output including the standardized individual store floor plan.

19 Claims, 9 Drawing Sheets

FIRST-LEVEL STANDARD FLOOR PLAN

SECOND-LEVEL STANDARD FLOOR PLAN

STORE A: STANDARDIZED INDIVIDUAL FLOOR PLAN

STORE B: STANDARDIZED INDIVIDUAL FLOOR PLAN

STORE A: SHOPPER EXPOSURE DENSITY DATA

STORE B: SHOPPER EXPOSURE DENSITY DATA

Fig. 11

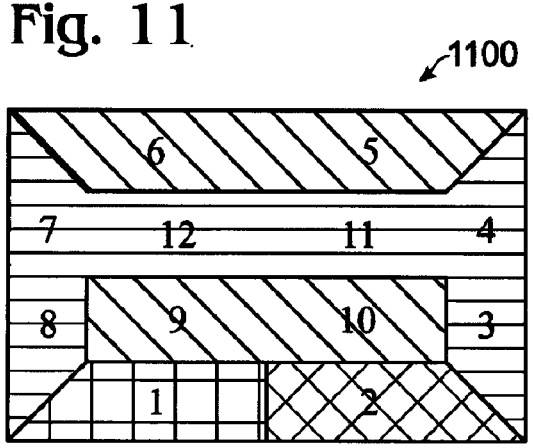

STORE A: NORMALIZED SHOPPER EXPOSURE DENSITY DATA

Fig. 12

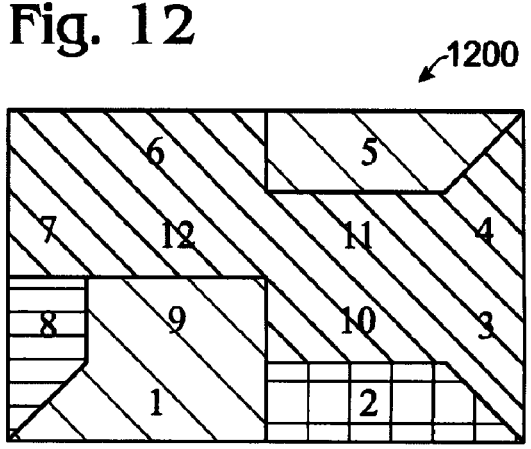

STORE B: NORMALIZED SHOPPER EXPOSURE DENSITY DATA

Fig. 13

| SECTOR | DESCRIPTION | STORE A | | STORE B | |
|---|---|---|---|---|---|
| | | Exp/WK(5ft$^2$) | SHARE | Exp/WK(5ft$^2$) | SHARE |
| 1 | FRONT LEFT | 1,151 | 16% | 996 | 7% |
| 2 | FRONT RIGHT | 2,395 | 33% | 2,479 | 18% |
| 3 | RIGHT FRONT | 109 | 1% | 1,164 | 8% |
| 4 | RIGHT REAT | 219 | 3% | 589 | 4% |
| 5 | REAR RIGHT | 304 | 4% | 1,191 | 8% |
| 6 | REAR LEFT | 330 | 4% | 1,203 | 9% |
| 7 | LEFT REAR | 211 | 3% | 671 | 5% |
| 8 | LEFT FRONT | 187 | 3% | 605 | 4% |
| 9 | CENTER FRONT LEFT | 758 | 10% | 2,299 | 16% |
| 10 | CENTER FRONT RIGHT | 979 | 13% | 882 | 6% |
| 11 | CENTER RIGHT REAR | 364 | 5% | 969 | 7% |
| 12 | CENTER REAR LEFT | 341 | 5% | 1,055 | 7% |
| | TOTALS: | 7,348 | 100% | 14,103 | 100% |
| | TRANSACTIONS/WK | 8,636 | | 16,800 | |
| | AVERAGE TRANSACTION | $26.41 | | $35.61 | |
| | ITEMS/WK | 81,758 | | 165,671 | |
| | AVERAGE ITEM | $2.79 | | $3.61 | |
| | $/WK (ACV) | $228,066 | | $598,202 | |
| | SIZE OF STORE | 35,000 | | 44,190 | |

STORE C: NORMALIZED SHOPPER EXPOSURE DATA
WITH PRODUCT CATEGORY OVERLAY INFORMATION

STORE C: NORMALIZED SHOPPER EXPOSURE DATA
WITH SHOPPING DOMAIN OVERLAY INFORMATION

IN-STORE MEDIA RATING SYSTEM AND METHOD

CROSS-REFERENCE TO RELATED APPLICATION

This application claims priority under 35 U.S.C. §119 to U.S. provisional patent application Ser. No. 60/815,056, entitled IN-STORE MEDIA RATING SYSTEM AND METHOD, filed on Jun. 19, 2006, the entire disclosure of which is herein incorporated by reference.

TECHNICAL FIELD

The present invention relates generally to a marketing analysis system and method, and more particularly to a system and method to analyze shopper data from various shopping environments, to thereby produce media exposure ratings.

BACKGROUND

Shopper exposure to media such as advertisements and products at various placements and orientations within a store may be measured using numeric expressions. For example, shopper exposure to such media may be measured by the number of shoppers in a predefined period. Shopper media exposure may be used to calculate a media rating. Media ratings in various shopping environments, such as stores, can be cataloged and ranked to provide valuable information for the advertisement industry and product manufacturers to perform strategic planning. However, since the media ratings are usually measured for specific sections in a store, it is difficult to compare the media ratings for stores with different layouts or store floor plans.

SUMMARY OF THE INVENTION

In-store media rating systems and methods are provided. According to one aspect, a method of analyzing shopper data from a plurality of shopping environments is provided, which comprises receiving data from a plurality of individual stores, each having an individual store floor plan including shopper accessible areas and shopper non-accessible areas, and providing a standard floor plan including a plurality of predefined sectors. The method may further include standardizing each respective individual store floor plan to produce a corresponding standardized individual store floor plan based on the standard floor plan, wherein each standardized individual store floor plan includes the same number of sectors as the standard floor plan, wherein relative location and shopper accessible area of each of the sectors in the each standardized individual store floor plan correspond to the location and shopper accessible area of a corresponding predefined sector of the standard floor plan. The method may further include producing an output including the standardized individual store floor plan.

The system and method may be used to normalize media exposure data gathered from stores with different floor plans to a standardized floor plan, to enable meaningful comparison of the media exposure data between stores with different layouts.

BRIEF DESCRIPTION OF THE DRAWINGS

FIG. 11 shows normalized shopper exposure density data for Store A of FIG. 7.

FIG. 12 shows normalized shopper exposure density data for Store B of FIG. 8.

FIG. 13 shows a tabular chart comparing the normalized shopper exposure density data of FIGS. 11 and 12.

DETAILED DESCRIPTION OF THE EMBODIMENTS

Figure 1:
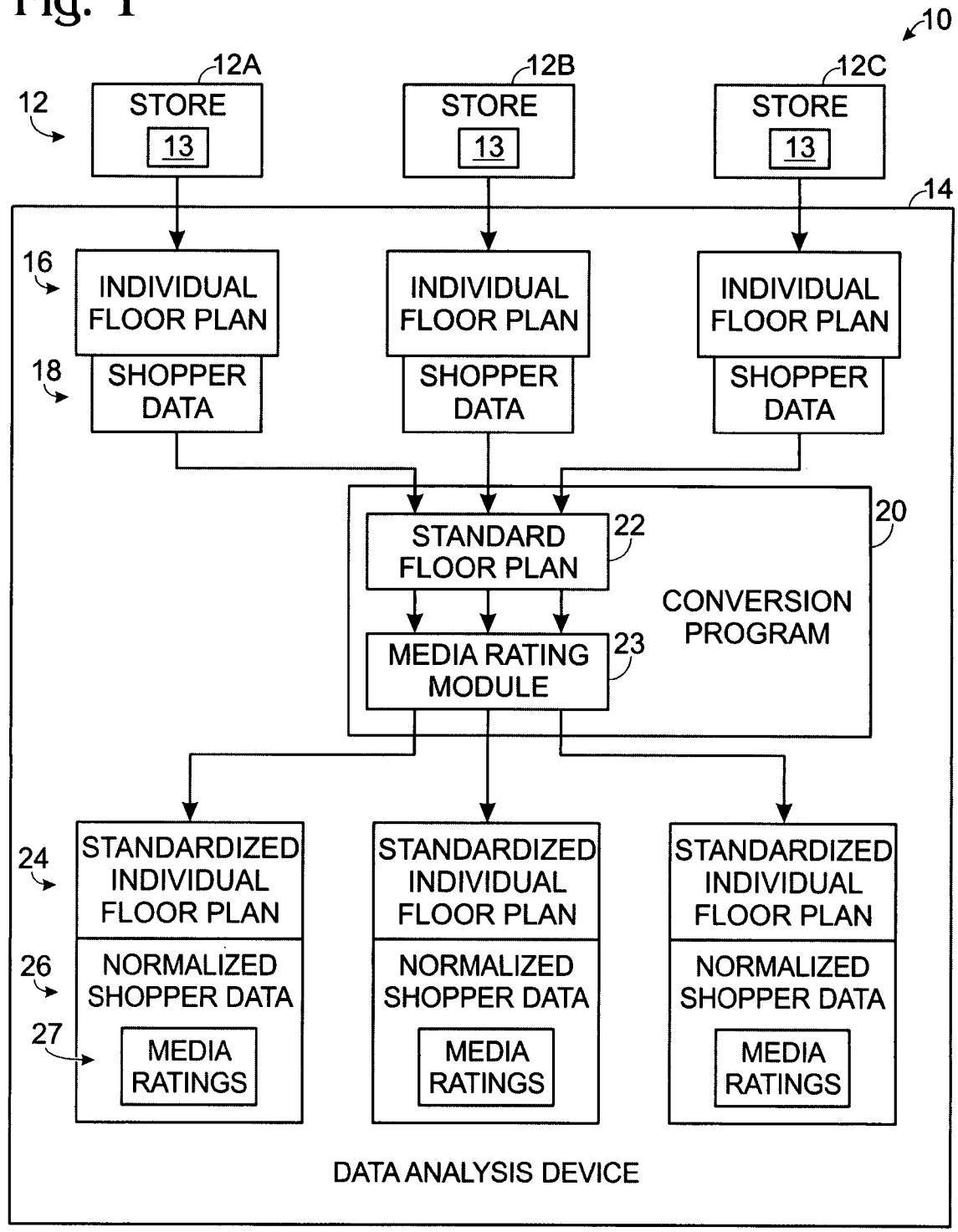
FIG. 1 is a schematic view of a shopper data analysis system for analyzing shopper data from a plurality of stores.

FIG. 1 is a schematic view of a shopper data analysis system 10 for analyzing data gathered from a plurality of shopping environments, such as stores 12. Shopper data analysis system 10 may include a data collection and transfer device 13 associated with each store, and a data analysis device 14 configured to receive data from each of the data collection and transfer devices 13. The data collected from each store may include an individual store floor plan 16 and shopper data 18 for each of the stores 12. The individual store floor plan 16 may include a physical description of the floor plan for the store, such as sizes or dimensions of shopper accessible areas and shopper non-accessible areas, as well as various overlaid data describing the locations of shopping domains, product categories, or other information, as described in detail below. The shopper data 18 may include shopper paths, purchase records, and other data that may be used to determine exposure to a target object such as advertising media, that a shopper receives in the store, as discussed below.

Data analyzing device 14 is typically a computing device having memory and a processor configured to execute a conversion program 20. Upon execution, the conversion program 20 is configured to utilize a standard floor plan 22, stored in memory, to convert each of the individual store floor plans 16 to respective standardized individual store floor plans 24, which are standardized to the units of the standard floor plan 22. Further, shopper data 18 for each individual store 12 may be further normalized to the respective standardized individual store floor plans 24, to thereby produce normalized shopper data 26. A media rating module 23 may further be provided in conversion program 20, and configured to process shopper data 18 to produce normalized media ratings 27. In this way, in spite of floor plan variations in different individual stores, shopper data from individual stores may be analyzed and compared in a standard scheme, and normalized media ratings 27 may be calculated and compared across stores. While three stores are shown in FIG. 1, it should be appreciated that data analysis system 10 may standardize and normalize data from any number of individual stores depending on the specific purpose of the analysis.

Figure 2:
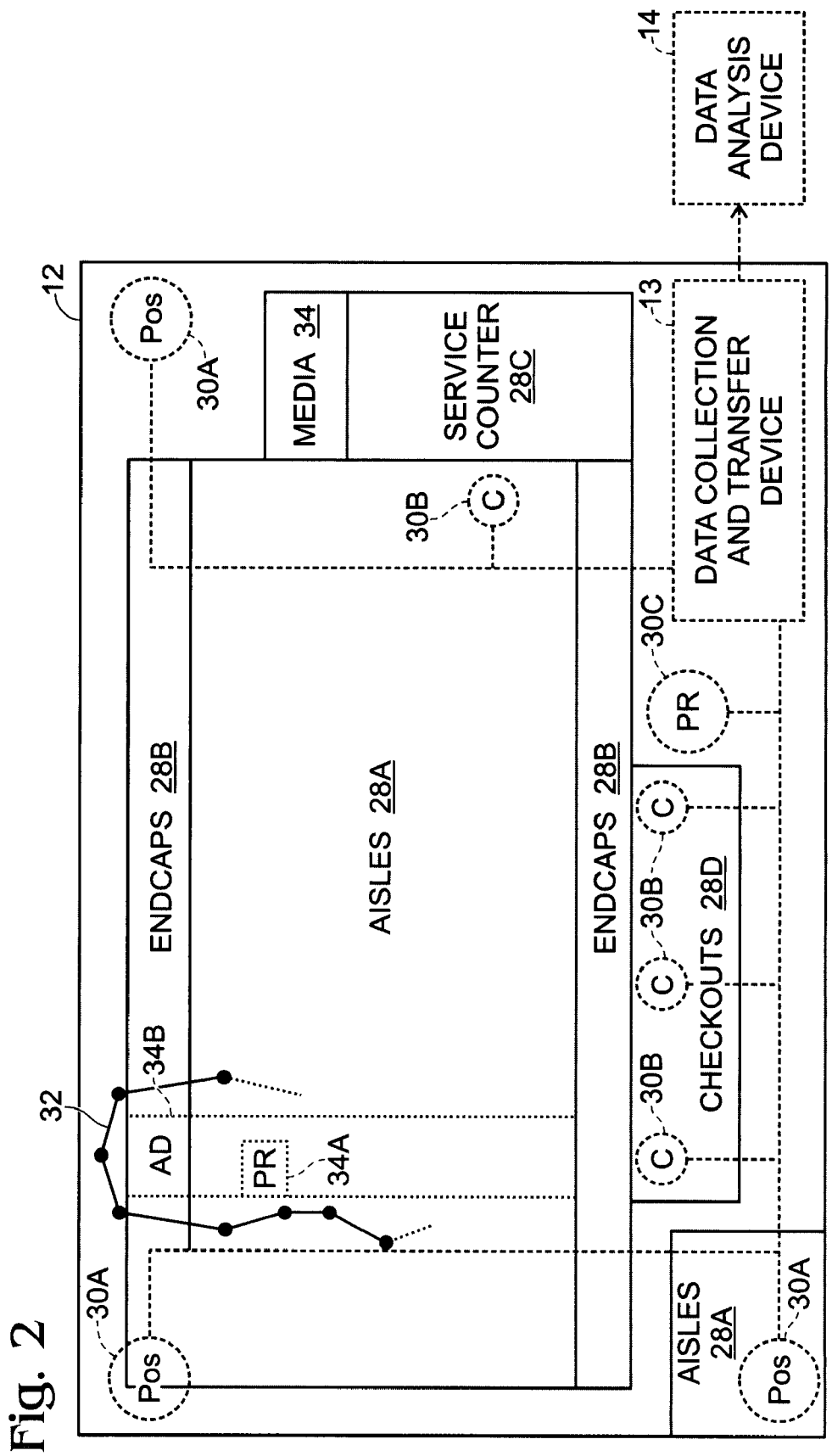
FIG. 2 is a partial detail view of the shopper data analysis system of FIG. 1, schematically illustrating installation of shopper data generating devices in a store.
Figure 14:
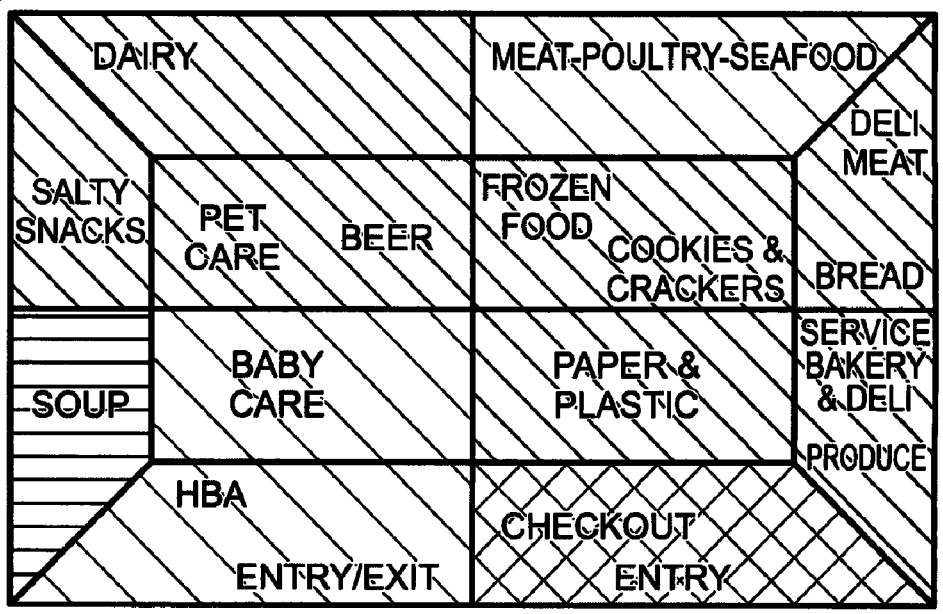
FIG. 14 shows a standardized individual store floor plan with normalized shopper exposure density data for an exemplary Store C, with overlay information including product categories.

As shown in FIG. 2, an individual store floor plan 16 for a store 12 may include various shopping domains 28, such as an aisle domain 28A, an endcap domain 28B, a service counter domain 28C, and a checkout domain 28D. It should be appreciated that these shopping domains are merely illustrative, and the individual store floor plan 16 for a store may include various other shopping domains depending on the particular analysis purpose. For example, the individual store floor plan 16 may include different shopping domains 28 such as entrances and exits, open bazaar area, etc. These shopping domains may be organized within a domain layer in the individual store floor plan 16. Further, the individual store floor plan 16 may include a product category overlay, which is categorized based on the type of products displayed in each area, such as salty snacks, frozen food, etc., as illustrated in FIG. 14.

One or more data generating devices 30 may be positioned in suitable locations in store 12, to generate shopper data based on shopping activity of shoppers. In the depicted embodiment, data generating devices may include a position data generating device 30A configured to detect shopper position (such as a sensor configured to wirelessly track a tag), an image data generating device (such as a still or video camera) 30B to provide shopper image data, and a purchase records data generating device 30C (such as a point of sale terminal) configured to provide purchase data. A series of shopper positions detected by position data generating device 30A may form a shopper path 32. The path data and/or image data may be used to measure the exposure to shoppers that media 34 located within the shopping environment, such as products 34A and advertisements 34B receive. The exposure may be measured, for example, by calculating the time that media stays within a shoppers estimated field of view. The estimated field of view for each shopper at each point along a shopper path may be calculated based on position data, or alternatively, may be derived from image data gathered from image data generating device 30B. Suitable methods for calculating exposure are described in U.S. Pat. No. 7,006,982, and copending U.S. patent application Ser. No. 11/179,306, the entire disclosures of which are herein incorporated by reference.

Shopper data may be transmitted via a communications network from each of data generating devices 30 to a data collection and transfer device 13 for temporary storage, and then forwarded to data analysis device 14 according to a predetermined schedule, on demand, in real time, etc. It will be appreciated that in some embodiments the data generating devices 30 may be configured to send the shopper data directly to data analysis device 14. In addition, although the data analysis device 14 is illustrated as being positioned outside the store 12, it will be appreciated that a portion or all of this device may be positioned within the store.

Figure 3:
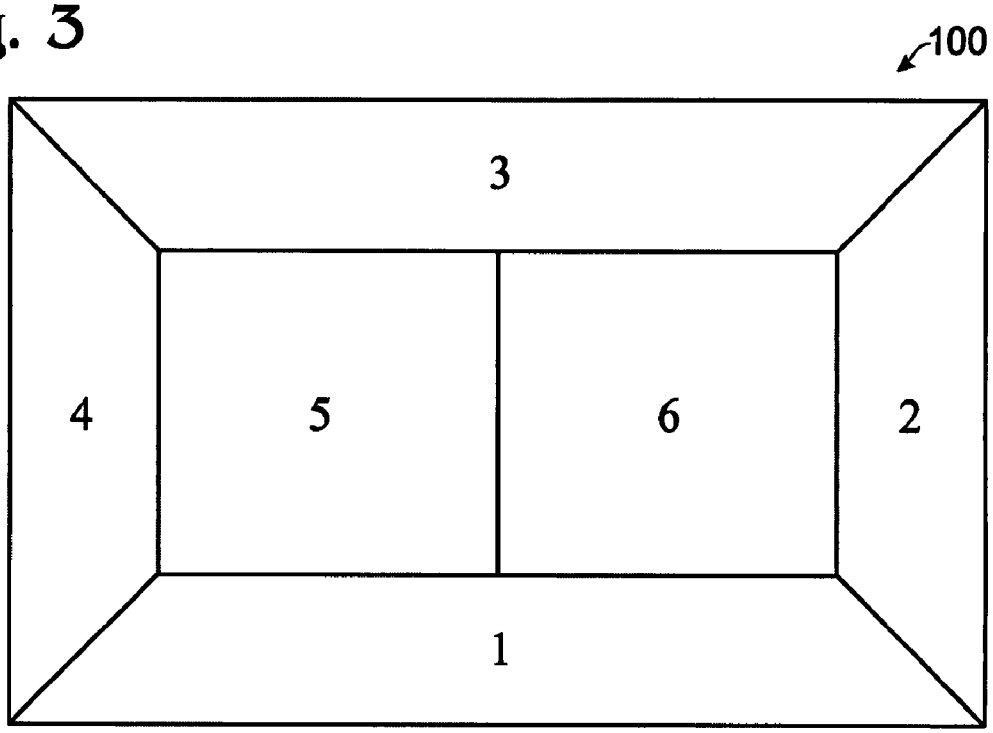
FIG. 3 is a schematic representation of a standardized sector scheme of a standard store floor plan according to one embodiment of the present disclosure.

FIG. 3 is a schematic representation of a first embodiment of a standard floor plan 100. The standard floor plan 100 is divided into a standardized sector scheme comprising a plurality of individual sectors. The standard sector scheme may represent an equal distribution of area, typically shopper accessible area, per individual sector distributed across a floor plan of the store. While in the depicted embodiment the individual sectors have equal areas, it will be appreciated that sectors of unequal areas may alternatively be used if desired. Further, in the depicted embodiment, the standard floor plan 100 is similar in shape to a golden rectangle, that is, a rectangle having dimensions of 1:1.68. A golden rectangle may be desired as a standard store floor plan because many stores use a floor plan that is some approximation of a rectangle, and the golden rectangle has proportions that have been recognized as aesthetically pleasing. However, it should be appreciated that in other embodiments a standard sector scheme may utilize virtually any desired shape, such as a square, circle, or more complex shape, without departing from the scope of the present disclosure.

FIG. 3 shows the standard store floor plan 100 including a first level of resolution which includes six first-level sectors with equal areas. The first-level sectors may be designated as Front (1), Right (2), Back (3), Left (4), Center-Left (5), and Center-Right (6). These sectors divide the store floor plan into six standardized sectors of equal area. Sectors 1-4 border a respective side of the rectangle, and sectors 5 and 6 are formed in a central region of the standard floor plan 100.

Figure 4:
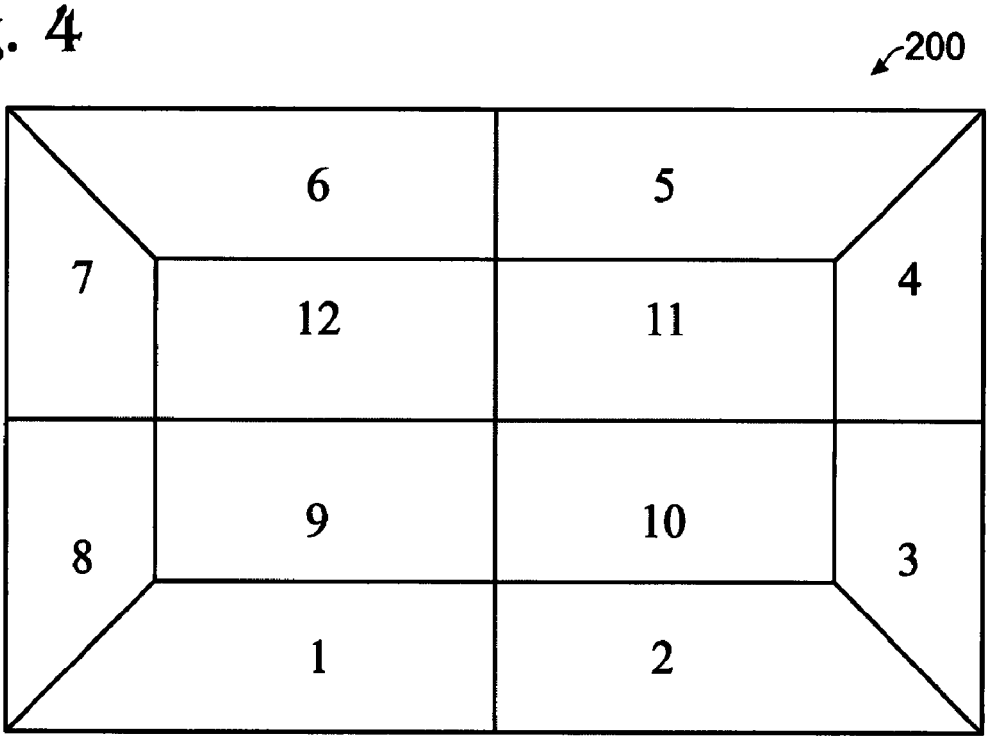
FIG. 4 is a schematic representation of a standardized sector scheme of a standard store floor plan according to another embodiment of the present disclosure.

FIG. 4 is a schematic representation of a standard sector scheme of a standard store floor plan 200 according to another embodiment of the present disclosure. As shown in FIG. 4, standard store floor plan 200 includes a second level of resolution which includes twelve second-level sectors. The second level of resolution may be created by dividing each of the six first-level sectors as shown in FIG. 3 into two equal area sectors. Thus, these second-level sectors divide the store floor plan into twelve standard sectors of equal area. Standard store floor plan 200 having twelve sectors may provide adequate resolution to accurately measure media exposures for the store segmentation and media rating studies anticipated in some embodiments of the present disclosure.

Alternatively, the second-level sectors further may be subdivided into 48 third-level sectors for more highly resolved studies. It should be appreciated that a standard store floor plan may be divided any suitable number of times depending on a desired resolution. Further, the resolution of the standard floor plan may not be uniform, but may be tailored to be more detailed in certain locations, as required by a particular project. Thus, for example, third-level resolution may be used in certain locations, second-level in other locations, and first-level resolution may be used in other locations, all within the same standard floor plan.

The above described standard sector scheme of a standard floor plan may be used to establish normative values for all stores and/or groups of stores in a particular media rating study. The standard floor plan may be used in combination with the methods discussed below to provide meaningful metrics for media exposure and other shopping data across classes of stores and store chains, despite differences in individual store layout.

Figure 5:
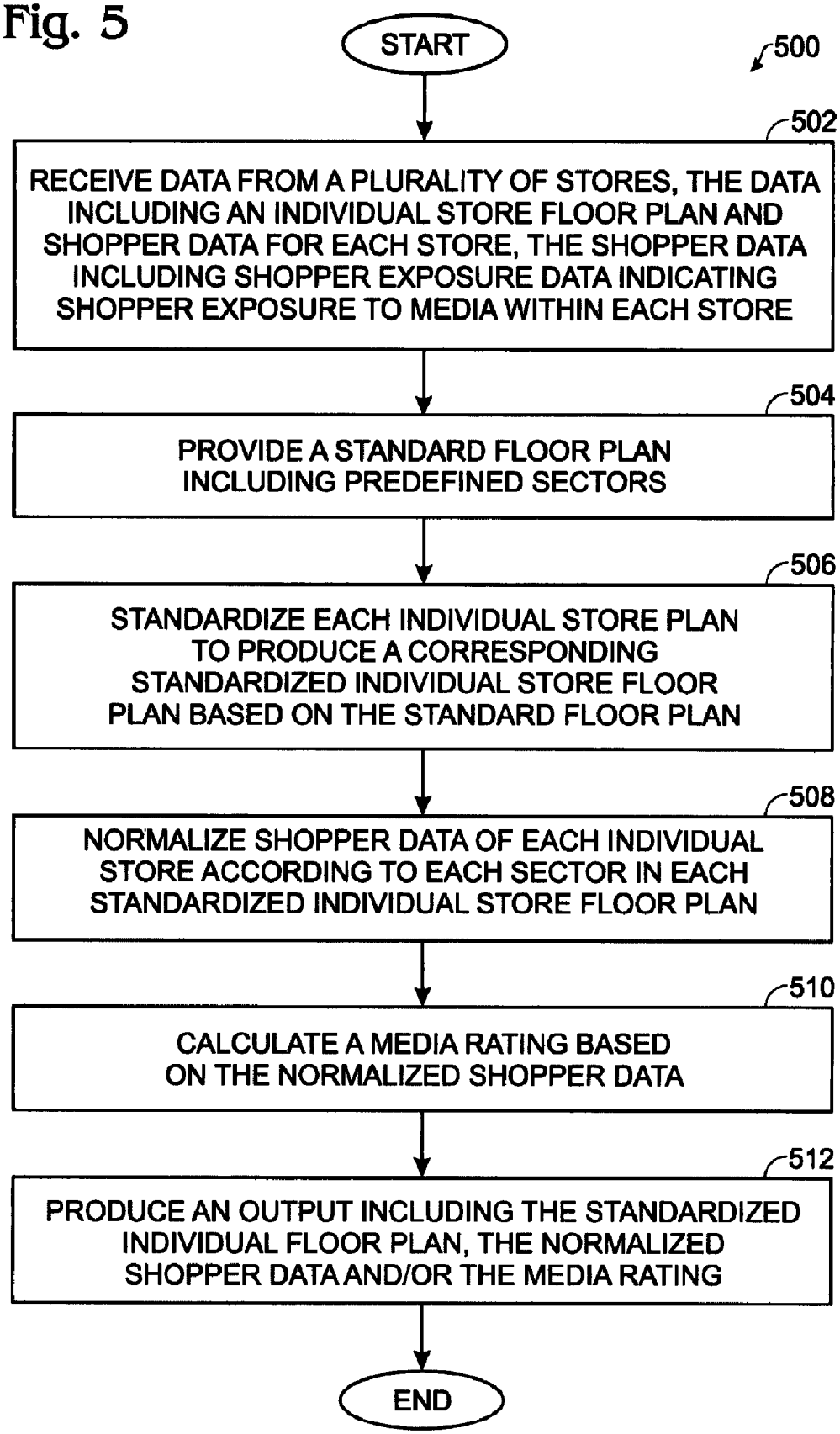
FIG. 5 shows a flowchart illustrating an example method of analyzing shopper data from a plurality of shopping environments.

FIG. 5 shows a flowchart illustrating an exemplary method 500 for analyzing shopper data from a plurality of shopping environments, such as stores. First, at 502, method 500 includes receiving data from a plurality of stores. The data may include the data an individual store floor plan and shopper data for each store, the shopper data may include shopper exposure data indicating shopper exposure to media within each store. The shopper data may also includes shopper position data, purchase data and/or image data, from which shopper exposure data may be determined, as described above.

Next, at 504, method 500 includes providing a standard floor plan including predefined sectors having respective relative positions and shopper accessible areas. In some embodiments, the standard floor plan may include a rectangular shape having sectors with equal areas. Alternatively, as described above, the standard floor plan may be configured to be in another suitable shape and include sectors of different sizes (i.e., resolutions) to suit the particular media rating analysis. At 506, method 500 includes standardizing each respective individual store floor plan to produce a corresponding standardized individual store floor plan based on the standard floor plan.

Various methods may be used to accomplish the standardization step at 506. For example, standardizing each respective individual store floor plan to produce a corresponding standardized individual store floor plan, may be accomplished in part by determining shopper accessible areas in each individual store floor plan, and mapping each sector in each individual store floor plan to a corresponding sector in the standard floor plan, such that each sector in the individual store floor plan has an equivalent location and ratio of shopper accessible area to a corresponding sector in the standard floor plan.

As used herein, it will be appreciated that the term "shopper accessible area" refers to traffic areas of a store which shoppers may access. Non-shopper accessible areas, including areas such as fixtures, counters, or any other area that a shopper cannot access, are typically excluded from the determination of shopper accessible area.

To determine the shopper accessible area in each individual store floor plan, a variety of methods may be used. For example, a grid of points may be created in both the standard store floor plan and individual store floor plan. The grid may include traffic points used to represent shopper accessible areas at which shopper movements may be recorded. Thus, shopper traffic detected traveling through the store by shopper position sensors 30A may be resolved to these traffic points. Null points may be defined in the grid in non-shopper accessible areas such as fixtures, counters, etc. The grid of traffic and null points may be divided into as fine of a resolution as desired for the particular analysis being conducted. In some embodiments, a 1 foot X1 foot grid may provide a suitably fine resolution.

Thus, mapping the shopper accessible areas in an individual store floor plan to the standard store floor plan, to thereby produce a standardized individual store floor plan may be accomplished by determining the total number of grid points for the shopper accessible area of an individual store as an initial step. Then, a standard store floor plan with exactly that number of grid points, or as many fewer or more as to accommodate the standard store floor shape can be created. Alternatively, the standard floor plan and individual floor plans may be formed to have a predetermined ratio of grid points; for example, the standard floor plan may have half or twice as many grid points as the shopper accessible area of the individual floor plan, etc. Shopper traffic traveling through the store is resolved to these grid points.

By creating standardized individual store floor plans and a standard store floor plan that have the same number of grid points, the standardization process may be accomplished by mapping every single grid point in the individual store to a congruent grid point in the standard store floor plan in such a way as to obtain a least square of movement of True Points (i.e., points in the individual store floor plan) to Ideal Points (i.e., points in the standard store floor plan). A method to determine the least square of movement of True Points and Ideal Points may include a least squares method of examining every combination and permutation of grid point (TruePoint to IdealPoint) transformations.

As an alternative to the least squares approach, computational processing can be reduced by performing an iterative quartering procedure on the grids of points representing the individual store floor plan, which can be readily done on a weighted center basis. The iterative quartering procedure is described in detail below in FIG. 6. In addition, it should be appreciated that other suitable statistical methods may be used for the mapping procedure to create sectors in standardized individual floor plan that have geographic weighted shopper accessible areas that correspond to corresponding areas in the standard floor plan.

Next, at 508, method 500 may include normalizing the shopper data for each of the plurality of stores according to each sector of the standardized individual store floor plan. In some embodiments, normalizing shopper data may accomplished by averaging the shopper data on a sector by sector basis, to produce a sector average for each sector.

At 510, the method may include calculating a media rating based on the normalized shopper data. As discussed above, the shopper data may include shopper exposure data indicating exposure to media, such as products and advertisements, that shoppers received during store visits. Based on this normalized shopper data received from a plurality of stores, a media rating may be calculated. With the standardized floor plan, normalized shopper exposure to media may be rated or compared among various stores with different layouts, to produce media ratings that are meaningful even across such disparately configured stores. A media rating calculated in this manner may provide the advantage of indicating differences in shopper data from sector to sector which can be driven only by the distribution of shoppers, not by differences in the physical layout of each sector in each store.

Next, at 512, method 500 may include producing an output including the standardized individual store floor plan, the normalized shopper data, and/or the media rating. The output, for example, may be displayed on a graphical user interface of a computing device such as data analysis device 14, by conversion program 20. Alternatively, the output may be a so-called hard copy, or may be an electronic copy of a report available for online download, distribution by recorded media such as CD-ROM, etc. Example forms of output are illustrated in FIGS. 7-15, discussed below.

Figure 6:
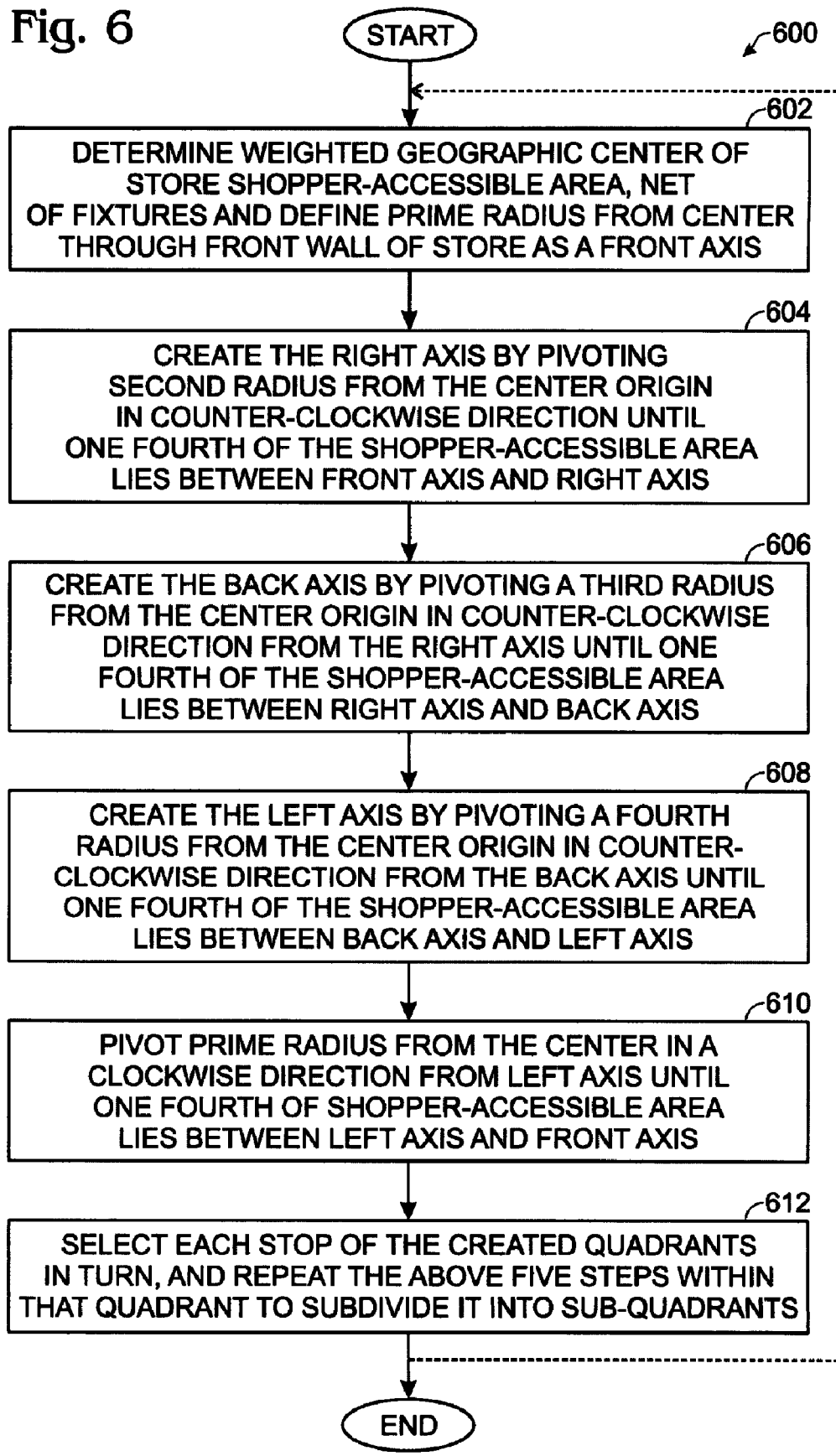
FIG. 6 shows a flowchart describing an exemplary standardization process illustrated in FIG. 5.

FIG. 6 shows a flow chart describing an exemplary standardization method 600 illustrated in FIG. 5. FIG. 6 shows an exemplary iterative quartering procedure on the store grids performed on a weighted center basis. In some embodiments, the weighted center may be a weighted geographic center of a store where half of the store traffic area or shopper accessible area may be above and below the center, and half may be to the left and to the right. In some embodiments, this process may result in four equal quadrants. In some embodiments, the quadrants may be unevenly shaped due to null zones (of null points indicating non-shopper accessible areas) which are unevenly distributed within a store floor plan. First, at 602, method 600 includes determining the weighted geographic center of store shopper accessible areas and defining a prime radius from center through a front wall of the store as a front axis. The weighted geographic center of the store floor plan is determined while taking into account null zones filled by fixtures and any shopper non-accessible areas. In many examples, the front of a store floor plan can be oriented towards the bottom of a drawing, for example, in a CAD map.

Thus, from the weighted geographic center a straight line to the front of the store can be drawn to create the prime radius and the front axis. However, it should be appreciated that, in practice, the store floor plan may have another desired orientation.

At 604, method 600 may include creating a right axis by pivoting a second radius from the center in a counterclockwise direction until one fourth of the store traffic area lies between the front axis and the right axis. The rotation may approximate the right axis, sometimes with some distortion, greater or less than 90 degrees from the starting point to accommodate the irregular distribution of null zones. The rotation and right axis provide a boundary line that combines with the front axis to encompass the lower right quadrant.

At 606, method 600 includes creating a back axis by pivoting a third radius from the center in a counterclockwise direction from the right axis until one fourth of the store shopper accessible area areas lies between the right axis and the back axis. The rotation will bring the radar sweep to approximately 180 degrees of its starting point, completing the second quadrant or the upper right quadrant.

At 608, method 600 includes creating a left axis by pivoting a fourth radius from the center in a counterclockwise direction from the back axis until one fourth of the store traffic area lies between the back axis and the left axis. The rotation and left axis provide a boundary line that combines with the back axis to encompass the upper left quadrant.

At 610, method 600 includes pivoting the prime radius from the center in a clockwise direction from the left axis until one fourth of store traffic area lies between the left axis and the front axis. The rotation and left axis provide a boundary line that combines with the front axis to encompass the lower left quadrant. Alternatively, the lower left quadrant may be defined as the portion leftover following step 608.

The above rotation process encompasses the entire store creating four equal area quadrants. The iterative quartering process creates four equivalent weight True Quadrants in an individual store floor plan which can be mapped into four Ideal Quadrants in the standard store floor plan. In this way, traffic areas in the individual stores may be weighed in conformation with Ideal Quadrants and the geographic distortion may be minimized.

Next, at 612, method 600 includes selecting each of the created quadrants in turn, and repeating the above five steps within the selected quadrant to subdivide the quadrant into sub-quadrants. The sub-quadrants further may be divided into sub-sub-quadrants, etc. to the level of granularity needed to achieve the desired resolution. In one example, the quartering method may be repeated as many times as desired until only one or two grid points exist in the final subdivision. Thus, the individual store floor plan (alternatively referred to as a True Store) may be completely mapped to the standard sector scheme of the standard floor plan (alternatively referred to as an Ideal Store).

Figure 7:
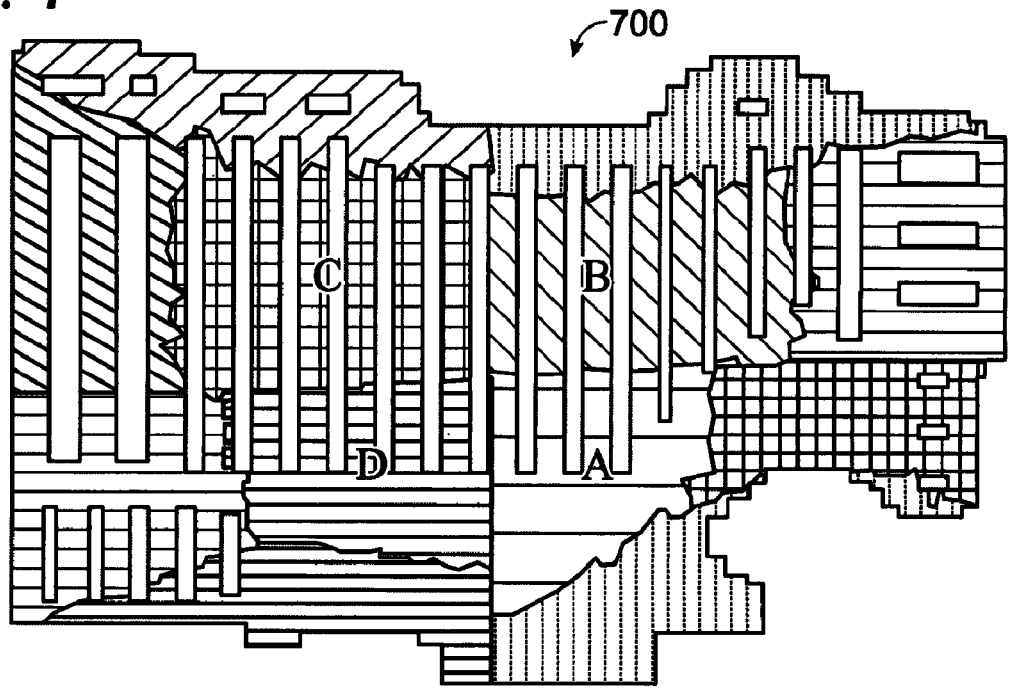
FIG. 7 shows one example standardized individual store floor plan for an exemplary Store A, which has been standardized according to the standard floor plan of FIG. 4.
Figure 8:
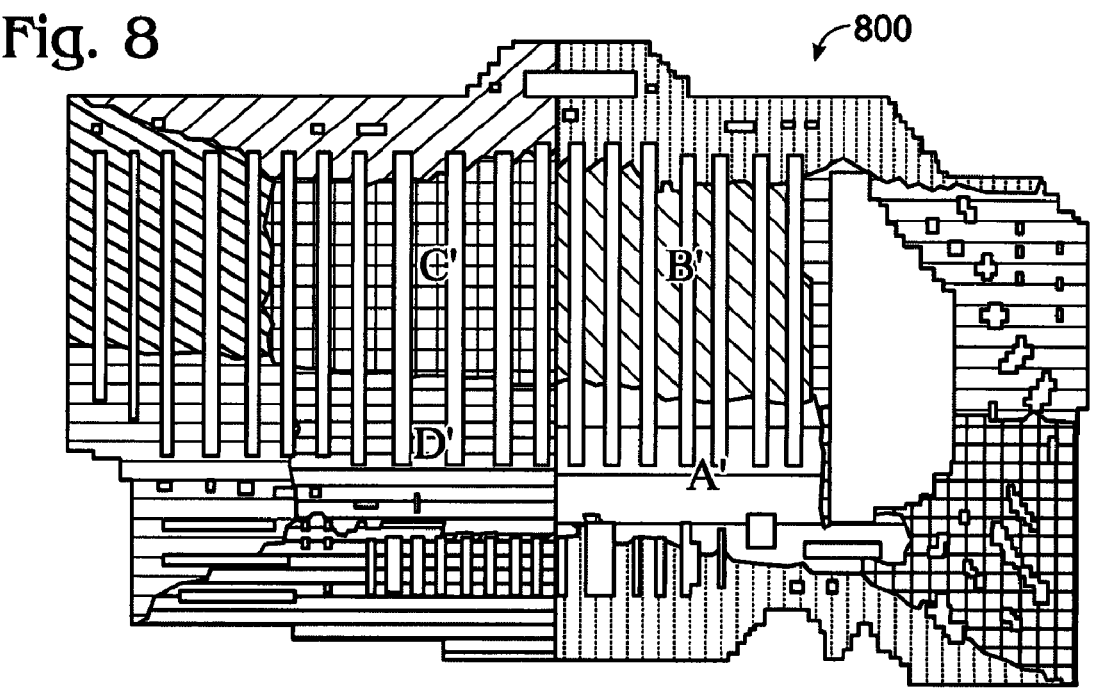
FIG. 8 shows another example standardized individual store floor plan for an exemplary Store B, which has been standardized according to the standard floor plan of FIG. 4.

FIGS. 7 and 8 show example standardized individual store floor plans that have been standardized according to the iterative quartering procedure of FIG. 6. In the standardized individual store floor plans shown in FIGS. 7 and 8, each sector is marked with a different shading and the sectors with like shading are associated. The individual store floor plans, 700 and 800 may be quite dissimilar. Thus, each sector as associated with a particular shading may differ in shape between the two store layouts as shown in FIGS. 7 and 8. However, the standardization and mapping process ensures that each associated set of sectors are equal in shopper accessible area.

Further, each associated set of sectors for the individual stores are similar in geographic weight (i.e. location) to their corresponding sectors in the standard store floor plan. For example, the weighted geographic center of the store as shown in FIG. 7, is typically at the exact intersection of the four shaded areas A, B, C, and D in the interior of the store floor plan 700, or substantially close thereto. Similarly, the weighted geographic center of the store as shown in FIG. 8 is typically at the exact intersection of the four shaded areas A', B', C', and D' in the interior of the store floor plan 800, or substantially close thereto. According to the mapping procedure, all other points in the individual floor plans are similarly geographically weighted, such as by square feet of space in one example, to their corresponding location in the sectors of the standard store floor plan. With the standardized individual store floor plans 700, 800, media rating data 27 and other normalized shopper data may be averaged for each sector to enable comparisons among various stores with different floor plans, as described below.

To study shoppers' behavior in a store, conversion program 20 may include a media rating module 23 configured to create in-store media ratings 27 that provide a measure of shoppers' exposure to media, such as product, advertisements, displays, etc., in a specific area of a store. In some embodiments, the media ratings may directly relate to a measurement of exposures of shoppers to displays of a store. The exposures may be expressed as the measurement of the shopper density and shopper flow in a specific area in a predefined period of time, for example.

Figure 9:
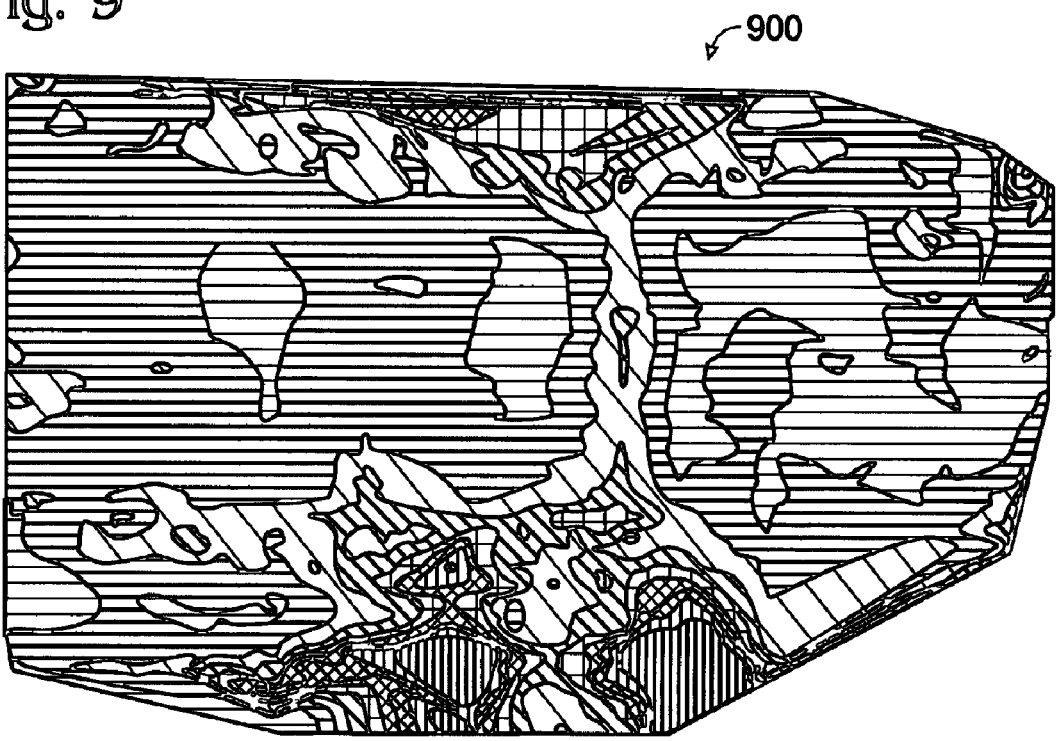
FIG. 9 shows exemplary shopper exposure density data for Store A of FIG. 7.
Figure 10:
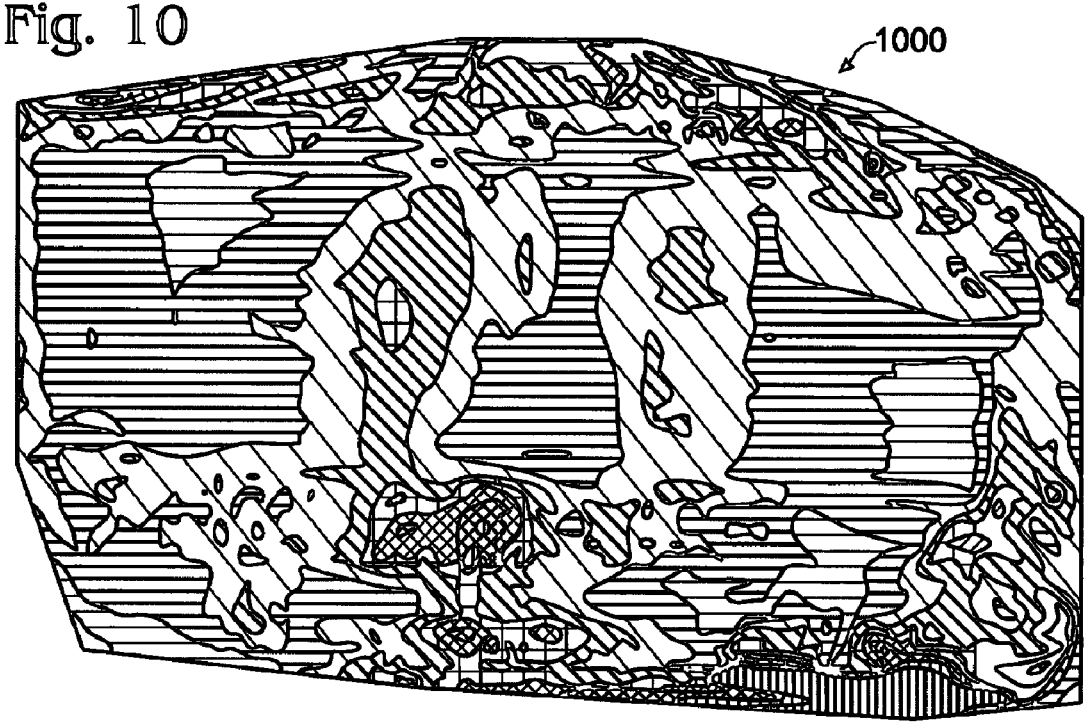
FIG. 10 shows exemplary shopper exposure density data for Store B of FIG. 8.

FIGS. 9 and 10 show exemplary exposure density maps for each of for two stores with different floor plans. It will be appreciated that the exposure density may be defined based on physical position of the shopper, as a number of shoppers per unit area in a predefined period of time, or based on an estimated or measured field of view of each shopper. Alternatively, other suitable measuring methods may be used. In FIGS. 9 and 10, different shadings represent different exposure densities in different areas of the stores. As shown in FIGS. 9 and 10, the two stores have dissimilar layouts which may make it difficult to compare data for media ratings 27 calculated in each store, using prior methods. Furthermore, if these comparisons are made to a larger number of stores, for example, in the thousands, the comparison difficulty may be compounded to the point of being impractical using prior methods.

However, by standardizing the individual store floor plans as described above, the exposure density maps may be simplified and more easily be compared, especially for comparison among a large number of stores. FIGS. 11 and 12 show example normalized shopper exposure density data for the Stores A and B depicted in FIGS. 9 and 10, mapped to the standard sector scheme of FIG. 4. As shown in FIGS. 11 and 12, the once dissimilar floor plans of FIGS. 9 and 10 are represented in a standardized format having sectors with equal area. For each sector in the standardized store floor plan, sector-specific normalized shopper data may be determined. For example, in the depicted embodiments, exposure density data has been averaged on a sector by sector basis to produce a sector-specific shopper exposure density as indicated by the different shadings associated with twelve sectors numbered from 1 to 12. Thus, normalized shopper exposure density associated with a specific area of a store can be easily compared with the density data of a specific area of a different store by comparing the matching sectors. Thus, through the standardization and normalization method of the present disclosure, normalized shopper data, such as the shopper exposure data, may be compared among a large number of stores and media ratings can be created in a practical and standardized manner.

Media ratings of standardized sectors may be expressed in a tabular form or a chart 1300, which may be suitable for comparisons of various magnitudes such as dozens, hundreds or thousands of stores. FIG. 13 shows a non-limiting example of a tabular standardized sector chart comparing the media exposure density of Store A and Store B, which are the subject of FIGS. 7-12. In some embodiments, the chart may include a column 1310 showing the number of sectors defining the resolution of the comparison. Column 1310 shows that the standardized individual store floor plan for each store includes twelve sectors, and is thus based on the standard floor plan of FIG. 4. Chart 1300 may include a column 1320 which describes the physical location of each sector, such as front left, front right, etc. Chart 1300 may also include column 1330 showing media data of Store A. Column 1330 may further includes a column 1332 showing the shopper exposures per week in a particular sector, and a column 1334 showing the exposure share percentage of a particular sector compared to other sectors in the Store A. Similarly, chart 1300 may also include column 1340 showing media data of Store B. Column 1340 may includes a column 1342 showing the shopper exposures per week in a particular sector, and a column 1344 showing the exposure share percentage of a particular sector compared to other sectors in the store B. It will be appreciated that the content of columns 1332, 1334, and 1342, 1344 constitute particular forms of media ratings 27, according to one embodiment.

As described above, the standardized shaded maps containing normalized exposure data shown in FIGS. 11 and 12 may be keyed to the share of exposures at the twelve different sectors of the store. However, the absolute number of exposures in the various stores may be based on the amount of time shoppers spend in that area (total seconds) as well as the quality and relevance of the exposures.

In some embodiments, the chart 1300 may include other categories used in various comparisons, such as transactions per week, average transaction in dollar amount, transaction items per week, average in dollar amount for transaction items, dollar amount per week, and size of individual store. The comparison categories described above may be used to compute in-store statistics. The following factors may be taken into account during the comparison: the competition among displays, the size of the display, the field of view, the total size of the store, etc. It should be noted that the total size of store may be considered due to the fact that as the size of a store increases, the exposure of any given display proportionally diminishes.

The data tabulated above for shopper exposure of a single display in the various store sectors presupposes that the display may be oriented in such a manner as to directly face all of the shopper traffic in that sector. However, actual shopper exposure to the display may relate to directions shoppers face or orientation of displays. For example, displays facing the back-side of shoppers may receive no actual exposure. Thus, the direction that shoppers face may be another attribute to consider when measuring the shopper exposure. In some embodiments, a four pointed directional sign may be implemented to measure the shopper exposure, where the length of each arrow is proportional to the share of shoppers contributing to that vector.

The exposure data described above may convert complex shopper behavior to simple numerical expressions. In some embodiments, stores can be assigned metrics typical for the nearest segment in terms of channel, size and sales volume, or category. It should be appreciated that a variety of suitable measures may be used for media ratings. The media ratings may be accurately assessed through periodic audits of representative stores. Through the standardization and normalization process described above, it is possible to make meaningful comparison of these media ratings among various stores with different floor plans. The comparison and analysis of media ratings may provide reliable guidance to in-store media companies such as advertisement companies in terms of the placement of media or advertisement in the stores.

In some embodiments, in addition to the location dimension, summarized above, there may be additional dimensions that may be related to a shopper population. FIG. 14 shows one exemplary standardized store floor plan with additional overlay information. As shown in FIG. 14, a standardized individual store floor plan may be overlaid with the location of products categorized based on type of product displayed in various areas throughout the store, as described with reference to FIG. 2. The product categories may include, for example, dairy, meat-poultry-seafood, salty snacks, pet care, beer, frozen food, cookies & crackers, deli meat, bread, soup, baby care, paper and plastic, service bakery and deli, health and beauty aids, entry/exit, checkout, entry, etc. Each sector of the standardized individual store floor plan may include one or more product categories. Through this overlay process the normalized shopper data may be compared to product categories, and thus shopper data such as exposure or percent share of exposure for each product category can be determined.

Figure 15:
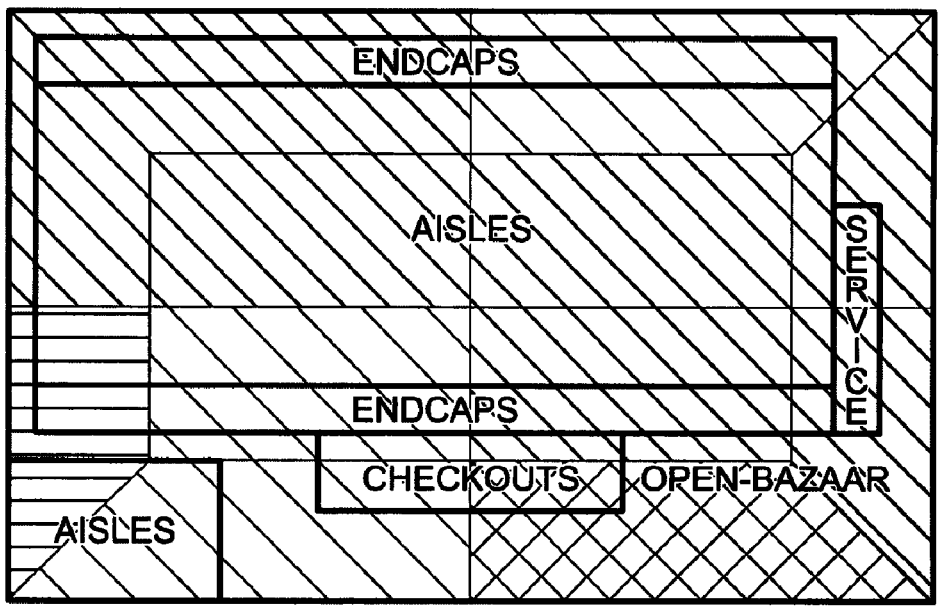
FIG. 15 shows a standardized individual store floor plan with normalized shopper exposure density data for exemplary Store C, with additional overlay information including shopping domains.

FIG. 15 shows another exemplary standardized individual store floor plan with additional overlay information in the form of shopping domain information. Shopping domains are defined based on the type of fixture or environment where the shopping occurs as described above with reference to FIG. 2. Each shopping domain may be categorized based on an impact of displays to the exposure to shoppers. For example, one type of shopping domain may include product display areas such as aisle domains, and may be referred to as a primary or gondola display. Other shopping domains may include end caps, lobby displays, open-bazaar areas, etc. and may be referred to as secondary displays. Further, service areas (e.g., delis, bakeries, etc.) and checkout lines may be categorized as two additional distinct shopping domains.

It will be appreciated that the normalized shopper data for a group of standardized individual store floor plans may be combined in an aggregate normalized shopper data set on an aggregate floor plan identical to the standard floor plans discussed above.

Further, it will be appreciated that once shopper data for a group of stores is normalized using the standardized individual store floor plan for each store, the stores may be grouped into segments (i.e., groups of stores) which exhibit similar patterns of shopper data. For example, stores may be grouped into a segment if the stores have normalized shopper data that indicates similar patterns in shopper exposure density, shopper flow, and other traffic measures. In the case of shopper traffic grouping, stores may be grouped into a single segment that includes stores with similar traffic patterns, such that a majority of the sectors in each standardized individual store floor plan will have associated normalized shopper data that indicates similar shopper density and flow.

It will be appreciated that different store segments (i.e. different groups of stores) will be characterized by different traffic patterns. For example, some stores may have more traffic on the right, and other stores may have more traffic on the left, and yet other stores may have a more uniform traffic distribution. Each identifiable distinct distribution of stores can be used to define a segment of stores (group of stores) with such similar properties.

One application of store segmentation is that stores may be segmented, i.e. collected into groups, based on where products or product categories are geographically located within each individual store. This may be accomplished by examining the above described product category overlay information for each individual store, which relates one or more geographical locations of each product or product category in each store, and grouping the stores together into segments in which products are positioned in similar locations, typically sectors. This process of store segmentation by product category is a normalization product location data for each of a plurality of stores to a sector scheme of a standard floor plan.

While shopper traffic data is dependent on the physical layout of a store, it will be appreciated that product placement in stores is independent of the physical layout of each store. Thus, product location may be referred to as being "orthogonal" to shopper traffic data. To derive meaningful comparisons of product placement in differently shaped and stocked stores, the stores may be segmented by the location of products within the stores.

For example, all stores in which peanut butter is located in sector 1 may be said to form a sector 1 peanut butter orthosegment, which is a group of stores sharing the characteristic that peanut butter is in sector 1. This sector 1 peanut butter orthosegment of stores will also typically include normalized shopper data, for example, indicating traffic patterns for the orthosegment stores. By way of example, the orthosegement, stores may include aggregate normalized shopper data indicating 15% geographic left dominant traffic; 30% uniform traffic and 55% right dominant traffic.

It will be appreciated that the peanut butter orthosegment example represents just one product category. Alternatively, there can be any suitable number of product categories represented, such as 2, 20, 40, 80, or more categories, or whatever is deemed appropriate by an analyst. Further, the above example uses a standard store floor plan with only left, right, and center sectors; however, it will be appreciated that a standard floor plan of more sectors, such as the first- and second-level sector schemes illustrated above, may alternatively be used.

Each sector in the standardized individual store floor plans of each store in the peanut butter orthosegment has normalized shopper data associated with the sector, including normalized shopper exposure or traffic data. To determine the shopper exposure to a particular product category such as peanut butter, the product category is indexed to orthosegments where it is found (groups of stores with similar product category geography), and then the shopper exposure data from those orthosegments is weighted appropriately, based on the normalized exposure data of the sector in which the product is located in the stores in the orthosegment. Put another way, since the proportion of each type of segment is known, shopper data exposure can be applied in a proper ratio to determine the actual exposure of peanut butter across the orthosegment. And, data from a plurality of orthosegments, each representing a product category in a different sector within the standard floor plan, may be combined to calculate the total exposure for all sectors in which the product is located in the stores under analysis. To achieve this weighting, a weighting factor may be calculated, such as the percentage of stores among all stores in a data set, in which a product is found in each sector (i.e., for each orthosegment). Thus, if Store A and Store B form the data set under analysis, and if peanut butter is found in Store A in Sector 1, and Store B in Sector 2, a 50% peanut butter weighting may be calculated for sector 1, and a 50% weighting factor for sector 2. This weighting factor may then be applied to other normalized shopper data (such as exposure density) in the relevant sectors, and a media rating may be calculated for the normalized shopper data based on the product location. In this example, a total peanut butter exposure media rating may be calculated on a sector by sector basis across the entire idealized store.

This process may be referred to as orthogonal segmentation, since it involves comparing two independent, orthogonal segment schemes (geographic and product) in order to determine measures for the independent variable, product category, which in this example is peanut butter. As the above discussion demonstrates, the shopper exposure data is not related to, (i.e., dependent on) product category, it is related to geography (i.e., location).

Using the above described methods, stores may be segmented according to distinct traffic patterns, and product categories may be indexed to their respective locations in various places with various traffic conditions. A group of stores may be identified in which a product category is located in a common sector of the standardized individual store floor plans for the stores, and a shopper exposure to the product category for the group of stores based on the normalized shopper data for the common sector may be determined, using weighting techniques. This enables meaning comparison of shopper traffic data by product category across a plurality of stores of different size and layout.

It should be appreciated that the in-store media ratings system may be applied to a wide variety of channels, including supermarkets, supercenters, convenience stores, home electronics stores, auto parts stores, gift/specialty retailers and drug stores. Furthermore this methodology may be applied to any other channel or chain of stores. Alternatively, the methods may be employed to rate media exposures in environments such as, for example, museums, zoos, theme parks, and other environments where media is present.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A method for analyzing shopper data from a plurality of shopping environments at a shopper data analysis system, comprising:

receiving data from a plurality of individual stores each having an individual store floor plan including shopper accessible areas and shopper non-accessible areas by a data analysis device wherein the data are received from one or more data collection and transfer devices;

providing a standard floor plan including a plurality of predefined sectors having respective relative locations and shopper accessible areas where the standard floor plan is stored in memory of the data analysis device;

standardizing each respective individual store floor plan by a conversion program executable by the data analysis device to produce a corresponding standardized individual store floor plan based on the standard floor plan, each standardized individual store floor plan including the same number of sectors as the standard floor plan, the relative location and shopper accessible area of each of the sectors in each standardized individual store floor plan corresponding to the location and shopper accessible area of a corresponding predefined sector of the standard floor plan, the conversion program further executable by the data analysis device to standardize the individual store floor plan by dividing each individual floor plan into a plurality of grid areas to represent traffic points of each store, creating the same number of grid areas in the standard floor plan, mapping each grid area in the individual floor plan to each corresponding grid area in the standard floor plan so that a weighted grid area in the individual floor plan is created, the weighted grid area having an equivalent geographic location and shopper accessible area to each corresponding grid area in the standard floor plan, and defining boundary lines of each predefined sector of the individual store floor plan based on the weighted grid areas for each predefined sector; and producing an output by the data analysis device, the output including the standardized individual store floor plan.

2. The method of claim 1, wherein, for each standardized individual floor plan, a ratio of the shopper accessible area of each sector to an entire shopper accessible area of the standardized individual store floor plan is substantially the same as a ratio of an area of a corresponding sector in the standard floor plan to the entire area of the standard floor plan.

3. The method of claim 2, wherein each individual store floor plan and the standard floor plan each comprise a grid of traffic points, and wherein standardizing each respective individual store floor plan to produce a corresponding standardized individual store floor plan, further comprises:

mapping each sector in the individual store floor plan to each corresponding sector in the standard floor plan such that each sector in the individual store floor plan has an equivalent location and ratio of shopper accessible area to a corresponding sector in the standard floor plan, the shopper accessible area of each sector being determined by the number of traffic points within the sector.

4. The method of claim 1, wherein the sectors of the standard floor plan have substantially equal area.

5. The method of claim 4, wherein the standard floor plan is substantially rectangular.

6. The method of claim 1, wherein standardizing each respective individual store floor plan to produce a corresponding standardized individual store floor plan, comprises:

(a) determining a weighted geographic center of the entire shopper accessible area of the individual store floor plan;

(b) from the weighted geographic center, determining a first-level quadrant by dividing the entire shopper accessible area with boundary lines to create quadrants such that each first-level quadrant includes one fourth of the shopper accessible grid areas of the entire shopper accessible area;

(c) determining a weighted geographic center of each first-level quadrant;

(d) from the weighted geographic center of a quadrant, determining a second-level quadrant by dividing the first-level quadrant with boundary lines to create quadrants such that each second-level quadrant includes one fourth of the shopper accessible grid areas of the first-level quadrant; and (e) repeating steps (c) and (d) to determine next level quadrants until a desired number of quadrants is obtained, such that boundary lines for each sector of the individual store floor plan is defined.

7. The method of claim 6, wherein the method further comprises:

normalizing the shopper data for each of the plurality of stores according to each sector of the standardized individual store floor plan, to thereby produce normalized shopper data;

wherein the output further includes the normalized shopper data associated with the standardized individual store floor plan.

8. The method of claim 7, wherein the shopper data is one of shopper exposure to media per unit area over a predefined period of time and share of shopper exposure of each sector relative to total sectors in the individual store.

9. The method of claim 8, wherein the shopper exposure to media is based on at least one of amount of time shoppers spent in an area and direction shoppers faced in an area.

10. The method of claim 7, wherein comparing the normalized shopping data from the plurality of stores using the standardized individual store floor plan is further based on a size of the store.

11. The method of claim 7, wherein the shopper data includes shopper exposure data, the method further comprising, performing orthogonal segmentation by:

identifying a group of stores in which a product category is located in a common sector of the standardized individual store floor plans for the stores;

determining a shopper exposure to the product category for the group of stores based on the normalized shopper data for the common sector.

12. The method of claim 7, further comprising overlaying the standardized individual store floor plan with at least one of product categories and shopping domains.

13. The method of claim 12, wherein shopping domains include at least one of aisle domains, checkout domains, endcaps, service counter domains, and open bazaar domains.

14. The method of claim 6, wherein the shopper data is selected from the categories consisting of shopper exposure, transaction items, and transaction amount measured by currency per unit area over a predefined period of time.

15. The method of claim 1, wherein standardizing each respective individual store floor plan includes using a least squares method to minimize a difference between positions of grid points in the individual floor plans and positions of corresponding grid points in the standard floor plan.

16. A shopper data analysis system for analyzing shopper data from a plurality of shopping stores, comprising:

for each of the plurality of shopping stores, each of the plurality of shopping stores having an associated individual floor plan, a data generating device configured to generate shopper data based on shopping activity of shoppers; and a data analysis device including a conversion program stored in memory of and executable by the data analysis device, the conversion program being configured to:

receive the shopper data generated from the data generating device and the associated individual floor plan of each of the plurality of shopping stores, and standardize each of the associated individual floor plans to form a corresponding standardized individual floor plan for each of the plurality of shopping stores, the standardized individual floor plan for each of the plurality of shopping stores having a predefined number of equally-sized sectors corresponding in physical location and ratio of shopper accessible area to sectors in a standard floor plan, enabling a comparison of shopper data among the plurality of shopping stores by, for each of the associated individual floor plans, dividing the associated individual floor plan into a plurality of grid areas representing traffic points of each store, creating an identical number of grid areas in the standardized individual floor plan, mapping each grid area in the associated individual floor plan to each corresponding grid area in the standardized individual floor plan such that a weighted grid area in the standardized individual floor plan is created, the weighted grid area having an equivalent geographic location and shopper accessible area to a corresponding grid area in the standardized individual floor plan, and defining boundary lines of each sector of the associated individual store floor plan based on the weighted grid areas in each sector.

17. The shopping data analysis system of claim 16, wherein the shopper data includes media exposure data consisting of a number of shoppers per unit area over a predefined period, an amount of time shoppers spent in an area, and a direction shoppers faced in the area.

18. The shopping data analysis system of claim 16, wherein the shopping data generating device is a shopper position data generating device.

19. The shopping data analysis system of claim 16, wherein the shopping data generating device is an image data generating device.

* * * * *